United States Patent Office 3,102,871
Patented Sept. 3, 1963

3,102,871
ANTIOXIDANTS
Ronald B. Spacht, Kent, Ohio, assignor to The Goodyear Tire & Rubber Company, Akron, Ohio, a corporation of Ohio
No Drawing. Filed May 1, 1961, Ser. No. 106,439
6 Claims. (Cl. 260—45.8)

This invention relates to the preservation of oxidizable compositions such as rubbers and gasoline and, more particularly, to the provision and use of a new class of phenothiazoxy compounds which are useful as age resistors for the various oxidizable rubbers and gasoline.

Unsaturated materials such as rubbers and gasoline are subject to deterioration from many sources, such as sunlight, ozone, atmospheric oxygen, the presence of heavy metals, etc. Both cured and uncured natural and synthetic elastomers are subject to such deterioration. Deterioration in cured stocks of rubber may vary with the type of stock, the state of cure and the amount of surface exposed. Also, the temperature of the oxidizable compositions is an important factor in deterioration. An ideal antioxidant would be one which would protect the oxidizable compound from deterioration regardless of time, physical state of the oxidizable compound, and regardless of use. Since no such general antioxidant has been discovered, compromises must be made in the selection of an antioxidant for a particular use.

It is an object of the present invention to provide an antioxidant composition which is capable of protecting various oxidizable rubbers and gasoline for extended periods of time. It is another object of this invention to provide a phenothiazoxy compound which is capable of protecting various oxidizable rubbers and gasoline from deterioration from oxygen, ozone, and/or sunlight.

In the practice of the present invention, various oxidizable compositions are protected from deterioration by incorporating therein a small amount of one or more phenothiazoxy compounds such as phenothiazoxy acids, phenothiazoxy salts, and phenothiazoxy esters. Although all of the foregoing classes of phenothiazoxy compounds are useful as rubber antioxidants the phenothiazoxy esters are preferred because they are somewhat more soluble in rubber than the corresponding acids and salts. These compounds may be made according to customary chemical practices. For example, the acids can be made by heating compounds of the general structure

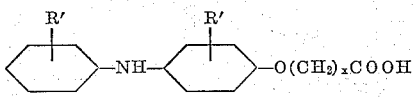

wherein R' is H or an alkyl radical having 1 to 4 carbons and $x$ is 1 to 4 with sulfur in the presence of a catalyst such as iodine at a temperature ranging from 150 to 200° C. The corresponding esters are made by first forming the esters of the parent acids and then treating these esters with sulfur at a temperature between 150 and 200° C. in the presense of $I_2$ or similar catalysts. Phenothiazoxy salts are formed from the metallic salts of

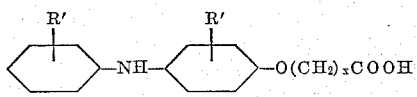

wherein R' is H or an alkyl radical having 1 to 4 carbons and $x$ is 1 to 4 reacted with sulfur in the presence of $I_2$ or some other catalyst at a temperature ranging from 150 to 200° C. or by heating the phenothiazoxy acids with corresponding metal hydroxides or salts.

The phenothiazoxy acids, salts, and esters of this invention can be described as phenothiazoxy compounds conforming to the following structure

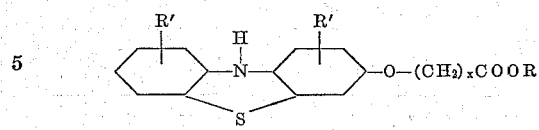

wherein R is selected from the group consisting of hydrogen, sodium, potassium, ammonium, and alkyl radicals containing from 1 to 9 carbon atoms, R' is selected from the group consisting of hydrogen and alkyl radicals having from 1 to 4 carbon atoms, and wherein $x$ is an integer of from 1 to 4.

Representative phenothiazoxy acids which are useful in the practice of this invention are phenothiazoxy acetic acid, phenothiazoxy propionic acid, phenothiazoxy butyric acid, phenothiazoxy pentanoic acid, methyl phenothiazoxy acetic acid, ethyl phenothiazoxy acetic acid, etc.

Representative phenothiazoxy salts which are useful in the practice of this invention are the alkali salts, the alkaline earth salts, and ammonium salts of the above acids.

Representative phenothiazoxy esters which are useful in the practice of this invention are the methyl, ethyl, propyl, butyl, isobutyl, amyl, isoamyl, hexyl, heptyl, octyl, isooctyl and nonyl esters of the above described acids.

The invention can be further illustrated by means of the following examples which are not intended as limitations on the scope of the invention.

EXAMPLE 1

Eighty-five grams of butyl-p-anilino phenoxy acetate, 20 grams of sulfur, and 1 gram of iodine were heated together at a temperature ranging between 170 and 200° C. at which temperature a rapid evolution of hydrogen sulfide gas took place. A complete reaction was completed in one-half hour, yielding 83 grams of solid butyl phenothiazoxy acetate having a melting point of 96–99° C. The solid composition was dissolved in acetone and poured into warm water from which it was recrystallized by means of methanol to yield crystals having a melting point of 107° C. Proof of the product obtained was by means of nitrogen and sulfur analysis. The nitrogen content was 4.33% as compared with a calculated percent of 4.25 and the sulfur content was 10.52 as compared with a calculated percent of 9.73.

EXAMPLE 2

Forty-one grams of p-anilino-phenoxy acetic acid and 9.6 grams of sulfur were heated to 170° C. and ½ gram $I_2$ added to the molten mixture. Reaction was quite vigorous and was complete in 10–30 minutes. On cooling, the whole mixture solidified, yielding 45.5 grams of residue. On dissolving in acetone and pouring into water, a solid was obtained. This solid, upon recrystallization from a methanol-water mixture, produced phenothiazoxy acetic acid, M.P. 188° C. Analysis gave 5.03% N and 11.32% S compared to theoretical values of 5.16% N and 11.8% S.

The compounds of Examples 1 and 2 were tested as antioxidants in extracted pale crepe gum stock vulcanizates, in a natural rubber tread stock, and in uninhibited catalytically cracked gasoline. The following formulation was used for extracted pale crepe vulcanizates:

| | |
|---|---:|
| Extracted pale crepe | 100.0 |
| Zinc oxide | 5.0 |
| Sulfur | 3.0 |
| Hexamethylenetetramine | 1.0 |
| Stearic acid | 1.5 |
| Antioxidant | 1.0 |

The stock was cured for 50 minutes at 285° F. Antioxidant efficiency was measured by aging 6 days in an oxygen bomb at a temperature of 50° C. and under a pressure of 150 pounds per square inch. The percent tensile retention and weight increase were used as measures of efficiency as shown in the following table.

*Table I*

| Material | Orig. Tensile | Final | Percent TR | Percent Wt. Inc. |
|---|---|---|---|---|
| Butyl-phenothiazoxy acetate | 2,150 | 2,350 | 109.5 | 0.29 |
| Butylated-p-cresol | 2,000 | 1,670 | 83.6 | 0.16 |
| No antioxidant | 2,000 | 0 | 0 | 18.00 |
| Phenothiazoxy acetic acid | 1,900 | 1,900 | 100.0 | 0.05 |

The antioxidants of Examples 1 and 2 were incorporated into the following natural rubber vulcanizate:

TREAD STOCK FORMULATION

Smoked sheet _____ 100.00
Zinc oxide _____ 3.25
Carbon black _____ 50.75
Sulfur _____ 2.75
Stearic acid _____ 3.50
Pine tar _____ 3.00
Mercaptobenzothiazole _____ 1.35
Antioxidant _____ 1.00

Samples were cured for 70 minutes at 260° F. and thereafter aged in an air bomb for 8 hours at 114° C. and 80 pounds per square inch pressure, giving the following results:

*Table II*

| Material | Orig. Tensile | Final | Percent TR |
|---|---|---|---|
| Butyl-phenlthiazoxy acetate | 4,260 | 2,930 | 68.8 |
| No antioxidant | 3,900 | 2,200 | 56.3 |
| Phenyl-β-naphthylamine | 4,160 | 2,640 | 63.6 |
| Butylated-p-cresol | 4,020 | 2,510 | 62.5 |
| Phenothiazory acetic acid | 3,400 | 2,300 | 67.6 |

The antioxidant prepared according to Example 1 was tested as an antioxidant for gasoline according to ASTM standard test D–525 known as the induction period test. A sample of uninhibited catalytically cracked gasoline was used as a base for the induction period test.

*Table III*

| Antioxidant | Conc., g./l. | Induction Period, Minutes |
|---|---|---|
| Butyl-phenothiazoxy acetate | 0.025 | 607 |
| Phenyl-β-naphthylamine | 0.025 | 238 |
| Control—no antioxidant | 0.025 | 193 |
| Butylated-p-cresol | 0.025 | 346 |

The above information illustrates the efficacy of phenothiazoxy compounds as antioxidants for oxidizable compositions such as rubbers and gasoline. Although this invention has been described by reference to pure compounds, mixtures of the several phenothiazoxy acids, mixtures of the several phenothiazoxy salts, and mixtures of the phenothiazoxy esters can be used in the practice of the invention. Also, mixtures of the various phenothiazoxy acids, salts, and esters can be used in the practice of the invention and are perhaps desirable because the use of such mixtures would not necessitate the costly procedure of purification.

The rubbers which can be protected by the products of this invention are the oxidizable rubbery polymers of conjugated dienes which include natural rubber and the various synthetic diene rubbers which are similar to natural rubber in their aging characteristics, such as poly- chloroprene; butyl rubber, which is a polymerization product of a major proportion of a mono olefin, such as isobutylene, and a minor proportion of a multi olefin, such as butadiene or isoprene; the rubbery copolymers of butadiene and styrene which may contain from 50 to 75% by weight of butadiene; the rubbery copolymers of butadiene and acrylonitrile and polyisoprene.

The products of the invention are useful as age resistors for raw rubbers in latex form, coagulated rubber latices or vulcanized rubbers, and may be present in an amount of from 0.25 to 5.0% by weight, based on the weight of the rubber, although it is generally preferred to use from 0.5 to 2.0% by weight, based on the weight of rubber.

The antioxidants of this invention can be incorporated into rubber in any customary manner. They may be added in the form of physical mixtures or in the form of emulsions using any of the known emulsifiers such as monovalent metal hydroxides, fatty acids, organic soaps, etc. They may be added to the rubber in the form of latex, or they may be milled into coagulated rubber in the usual manner.

The various highly refined hydrocarbons which can be protected by the products of this invention can be described as catalytically cracked, thermally cracked gasoline or blends thereof. Higher boiling fractions such as kerosene, fuel oil, and diesel oils are also included within the scope of this invention.

The compounds of this invention can be used to stabilize the highly refined hydrocarbons by adding about .001% to 0.1% by weight of the antioxidant to the highly refined hydrocarbons.

This application is a continuation-in-part of application Serial No. 836,071, now Patent No. 3,031,281, filed August 26, 1959, which in turn is a division of application Serial No. 693,544, filed October 31, 1957, and now abandoned.

While certain representative embodiments and details have been shown for the purpose of illustrating the invention, it will be apparent to those skilled in this art that various changes and modifications may be made therein without departing from the spirit or scope of the invention.

I claim:

1. An oxidizable rubber composition of a conjugated diene containing as an antioxidant in an antioxidant amount, a phenothiazoxy compound conforming to the following general formula:

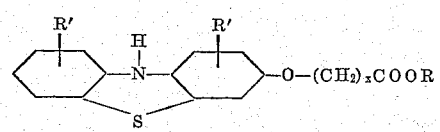

wherein R is selected from the group consisting of hydrogen, sodium, potassium, ammonium, and alkyl radicals containing from 1 to 9 carbon atoms, wherein R' is selected from the group consisting of hydrogen and alkyl radicals having from 1 to 4 carbon atoms and wherein $x$ is an integer of from 1 to 4.

2. An oxidizable rubber composition of a conjugated diene containing as an antioxidant in an antioxidant amount a phenothiazoxy acid conforming to the following formula

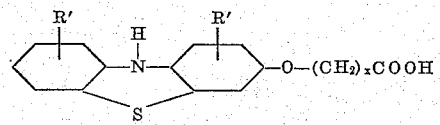

wherein R' is selected from the group consisting of hydrogen and alkyl radicals having from 1 to 4 carbon atoms and wherein $x$ is an integer from 1 to 4.

3. An oxidizable rubber composition of a conjugated diene containing as an antioxidant in an antioxidant amount a phenothiazoxy salt conforming to the following formula

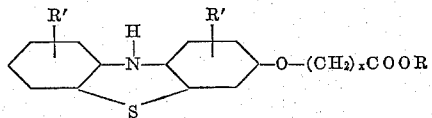

wherein R' is selected from the group consisting of hydrogen and alkyl radicals having from 1 to 4 carbon atoms, $x$ is an integer from 1 to 4 and R is selected from the group consisting of the alkali metals, the alkaline earth metals and ammonium.

4. An oxidizable rubber composition of a conjugated diene containing as an antioxidant in an antioxidant amount a phenothiazoxy ester conforming to the following formula

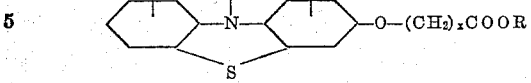

wherein R' is selected from the group consisting of hydrogen and alkyl radicals having from 1 to 4 carbon atoms, $x$ is an integer from 1 to 4 and wherein R is an alkyl radical containing from 1 to 9 carbon atoms.

5. An oxidizable rubber composition of a conjugated diene containing as an antioxidant in an antioxidant amount, butyl-3-phenothiazoxy acetate.

6. An oxidizable rubber composition of a conjugated diene containing as an antioxidant in an antioxidant amount, phenothiazoxy acetic acid.

References Cited in the file of this patent

Baltzly et al.: J. Am. Chem. Soc., vol. 68, pp. 2673–2678 (1946).